US007934705B2

(12) United States Patent
Sun et al.

(10) Patent No.: US 7,934,705 B2
(45) Date of Patent: May 3, 2011

(54) MULTI-DIRECTIONAL SUBMERSIBLE FLOATING AERATOR

(76) Inventors: Shulin Sun, Zoucheng (CN); Jian Sun, Zoucheng (CN)

( * ) Notice: Subject to any disclaimer, the term of this patent is extended or adjusted under 35 U.S.C. 154(b) by 0 days.

(21) Appl. No.: 12/684,229

(22) Filed: Jan. 8, 2010

(65) Prior Publication Data
US 2010/0109170 A1 May 6, 2010

Related U.S. Application Data

(63) Continuation-in-part of application No. 11/953,093, filed on Dec. 10, 2007, now Pat. No. 7,661,658, and a continuation-in-part of application No. 12/144,625, filed on Jun. 24, 2008, now Pat. No. 7,661,659.

(30) Foreign Application Priority Data

| Dec. 15, 2006 | (CN) | 2006 1 0168196 |
| Apr. 9, 2008 | (CN) | 2008 1 0089642 |
| Jul. 31, 2009 | (CN) | 2009 1 0160936 |

(51) Int. Cl.
*B01F 3/04* (2006.01)
(52) U.S. Cl. .......... 261/87; 210/242.2; 261/93; 261/120
(58) Field of Classification Search .................... 261/30, 261/87, 91, 93, 120, DIG. 47; 210/242.1, 210/242.2; 310/89; 415/7, 115, 170.1, 230; 416/85
See application file for complete search history.

(56) References Cited

U.S. PATENT DOCUMENTS

| 2,801,083 | A | * | 7/1957 | Balassa | 366/76.1 |
| 3,796,417 | A | * | 3/1974 | Kaelin | 261/93 |
| 3,823,923 | A | * | 7/1974 | Chapsal | 261/93 |
| 4,139,579 | A | * | 2/1979 | Blum | 261/29 |
| 4,242,289 | A | * | 12/1980 | Blum | 261/93 |
| 4,308,221 | A | * | 12/1981 | Durda | 261/87 |
| 4,618,426 | A | * | 10/1986 | Mandt | 210/620 |
| 4,732,682 | A | * | 3/1988 | Rymal | 210/620 |
| 4,774,031 | A | * | 9/1988 | Schurz | 261/87 |
| 4,954,295 | A | * | 9/1990 | Durda | 261/16 |
| 5,183,596 | A | * | 2/1993 | Rajendren et al. | 261/93 |
| 5,744,072 | A | * | 4/1998 | Karliner | 261/87 |
| 5,762,833 | A | * | 6/1998 | Gross et al. | 261/93 |
| 5,851,443 | A | * | 12/1998 | Rajendren | 261/87 |
| 6,126,150 | A | * | 10/2000 | Van Dyk | 261/87 |

(Continued)

FOREIGN PATENT DOCUMENTS
JP 4-78492 A * 3/1992 ............ 281/87

*Primary Examiner* — Richard L Chiesa
(74) *Attorney, Agent, or Firm* — Matthias Scholl, P.C.; Matthias Scholl

(57) ABSTRACT

A multi-direction submersible floating aerator has a gas-ring compressor (4), a base (6), a gas inlet tube (9), a seat (11), multiple submersible hollow shaft motors (13), and multiple propellers (14). The base (6) is disposed between the gas-ring compressor (4) and the gas inlet tube (9). The propeller (14) is coaxially connected to the submersible hollow shaft motor (13). The seat (11) is disposed between the gas inlet tube (9) and the submersible hollow shaft motor (13). The seat (11) is hollow. A first opening is disposed at the top of the seat (11), and multiple second openings are disposed on one side of the seat (11). The seat (11) is used for evenly distributing compressed air. Thus, the aeration is more even and stable, and aeration efficiency is greatly improved.

16 Claims, 5 Drawing Sheets

U.S. PATENT DOCUMENTS

| | | | |
|---|---|---|---|
| 6,860,474 B2 * | 3/2005 | Blakley et al. | 261/87 |
| 7,172,177 B2 * | 2/2007 | Durda | 261/28 |
| 7,661,658 B2 * | 2/2010 | Sun et al. | 261/87 |
| 7,661,659 B2 * | 2/2010 | Sun et al. | 261/87 |
| 2004/0130042 A1 * | 7/2004 | Blakley et al. | 261/87 |
| 2005/0263913 A1 * | 12/2005 | Rajendren | 261/93 |
| 2006/0087047 A1 * | 4/2006 | Mathur et al. | 261/93 |
| 2007/0035045 A1 * | 2/2007 | Henley | 261/87 |
| 2008/0143000 A1 * | 6/2008 | Sun et al. | 261/30 |
| 2009/0256269 A1 * | 10/2009 | Sun et al. | 261/93 |
| 2010/0109170 A1 * | 5/2010 | Sun et al. | 261/87 |

* cited by examiner

MULTI-DIRECTIONAL SUBMERSIBLE FLOATING AERATOR

CROSS-REFERENCE TO RELATED APPLICATIONS

This application is a continuation-in-part of U.S. application Ser. No. 11/953,093 filed on Dec. 10, 2007, now U.S. Pat. No. 7,661,658 which claims priority to Chinese Patent Application No. 200610168196.0 filed on Dec. 15, 2006. This application is also a continuation-in-part of U.S. application Ser. No. 12/144,625 filed on Jun. 24, 2008, now U.S. Pat. No. 7,661,659 which claims priority to Chinese Patent Application No. 200810089642.8 filed on Apr. 9, 2008. Pursuant to 35 U.S.C. §119 and the Paris Convention Treaty, this application further claims the benefit of Chinese Patent Application No. 200910160936.X filed on Jul. 31, 2009. The contents of all of the aforementioned national and foreign applications are incorporated herein by reference in their entirety.

BACKGROUND OF THE INVENTION

1. Field of the Invention

The invention relates to an aerator, and more particularly to a multi-directional submersible floating aerator.

2. Description of the Related Art

Nowadays submersible floating aerators are widely used for the purpose of mixing in air and increasing the dissolved oxygen (DO) content of the liquids. As shown in FIG. 1, a submersible floating aerator disclosed in the parent application comprises a compressed air pipe 1, and a submersible hollow shaft motor 2 comprising a hollow transmission shaft. Compressed air enters the submersible hollow shaft motor 2 via the compressed air pipe 1, and then is ejected into waste water via an axial hole of the hollow transmission shaft. However, several problems with conventional submersible floating aerators still remain unsolved. Among these are: great eccentric vibration occurring during operation, aeration is not even, aeration efficiency and oxygen aeration efficiency is low, and there is dead space during oxygen aeration.

SUMMARY OF THE INVENTION

In view of the above-described problems, it is one objective of the invention to provide a multi-directional submersible floating aerator capable of implementing stable, large-area and even aeration in waste water, and features stable operation, small vibration, large aeration range and area, and improved aeration efficiency and oxygen aeration efficiency.

To achieve the above objectives, in accordance with one embodiment of the invention, provided is a multi-directional submersible floating aerator, comprising a gas-ring compressor, a base, a gas inlet tube, a seat, multiple submersible hollow shaft motors, and multiple propellers; wherein the base is disposed between the gas-ring compressor and the gas inlet tube, the propeller is coaxially connected to the submersible hollow shaft motor, the seat is disposed between the gas inlet tube and the submersible hollow shaft motor, the seat is hollow, a first opening is disposed at the top of the seat, and multiple second openings are disposed on one side of the seat.

In certain classes of this embodiment, the seat is multi-directional.

In certain classes of this embodiment, the first opening is connected to the gas inlet tube.

In certain classes of this embodiment, the second openings are connected to the submersible hollow shaft motors.

In certain classes of this embodiment, the number of the second openings is two, and the second openings are symmetrical to one another.

In certain classes of this embodiment, the number of the second openings is three, and the second openings are evenly distributed.

In certain classes of this embodiment, the number of the second openings is four, and the second openings are evenly distributed.

In certain classes of this embodiment, multiple pull rods are disposed around the gas inlet tube, a top portion of the pull rod is connected to the base, and a bottom portion of the pull rod is connected to the submersible hollow shaft motor.

In certain classes of this embodiment, an impeller is disposed at the front of the propeller, and the impeller and the propeller rotate coaxially.

In certain classes of this embodiment, a bracket is disposed between the gas-ring compressor and the base.

In certain classes of this embodiment, the aerator further comprises a floating ball connected to the bottom of the base via a first support.

In certain classes of this embodiment, the aerator further comprises a rain cover disposed above the gas-ring compressor.

In certain classes of this embodiment, the aerator further comprises a dome disposed on one end of the submersible hollow shaft motor.

In certain classes of this embodiment, the aerator further comprises a second support disposed below the seat.

In certain classes of this embodiment, the aerator further comprises an air inlet pipe connected to the gas-ring compressor.

In certain classes of this embodiment, the aerator further comprises a compressed air pipe connected between the gas-ring compressor and the gas inlet tube.

Advantages of the invention include the following: since the multi-directional seat is used for evenly distributing compressed air, and an axial hole of a hollow transmission shaft of the submersible hollow shaft motor sprays and spreads air to the surrounding of the multi-directional submersible floating aerator, aeration is more even and stable, and aeration efficiency is greatly improved.

BRIEF DESCRIPTION OF THE DRAWINGS

The invention is described hereinafter with reference to accompanying drawings, in which.

DETAILED DESCRIPTION OF THE EMBODIMENTS

Figure 1:
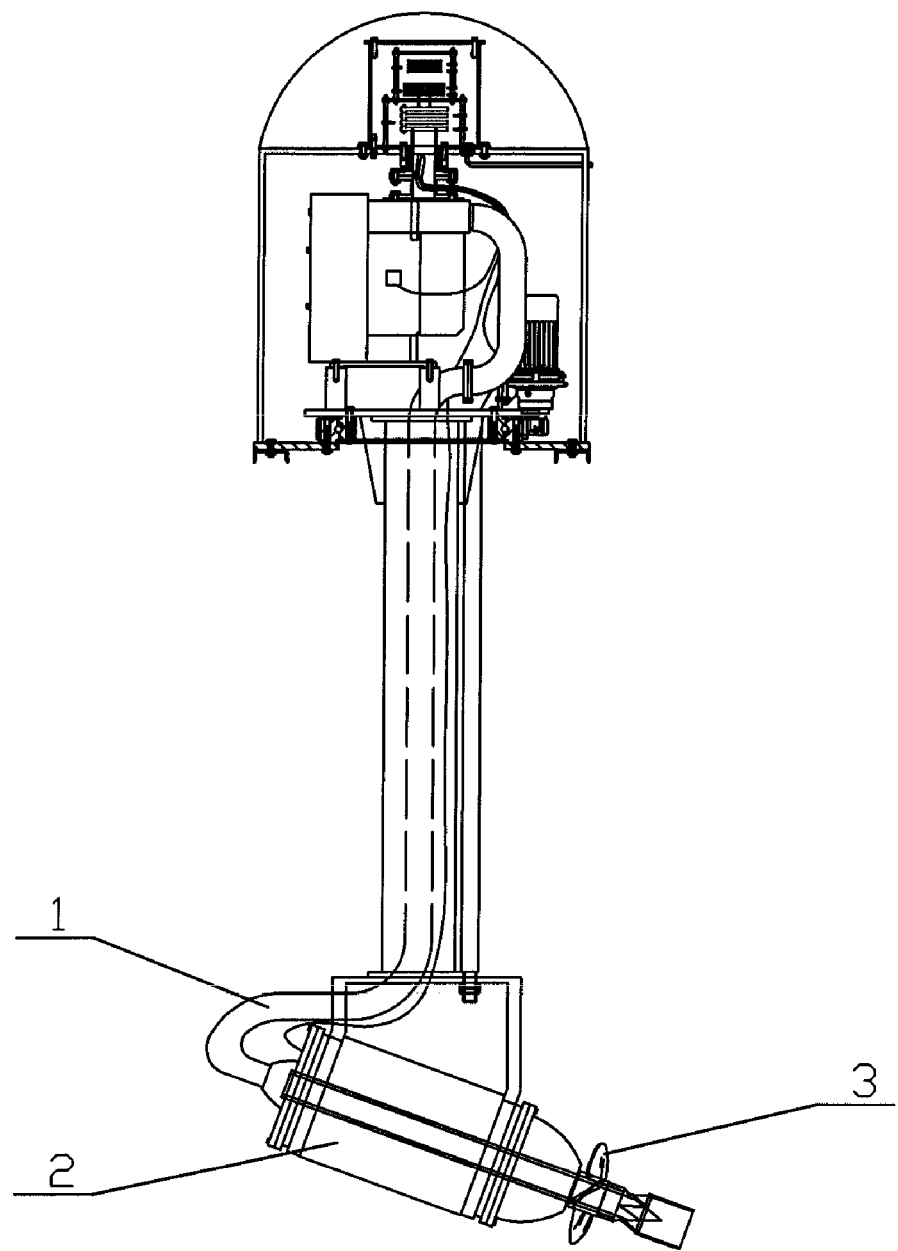
FIG. 1 is a front view of a submersible floating aerator described in the parent application.
Figure 2:
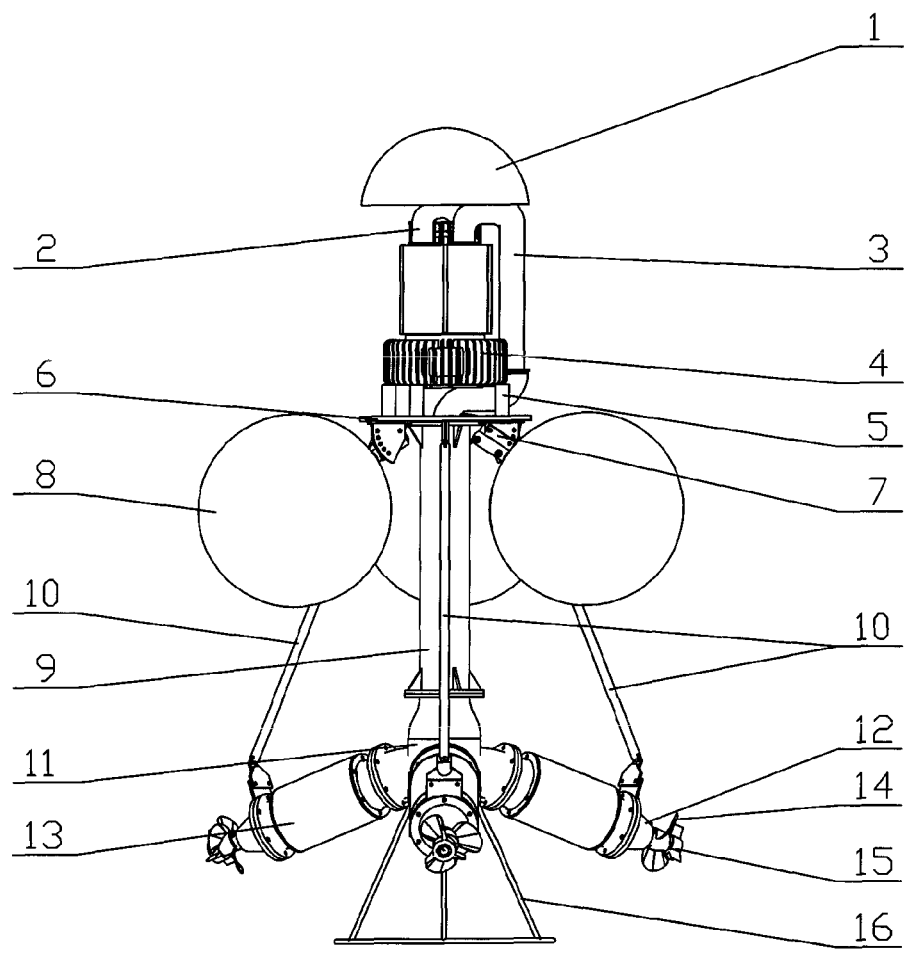
FIG. 2 is a front view of a multi-directional submersible floating aerator of an exemplary embodiment of the invention.
Figure 3:
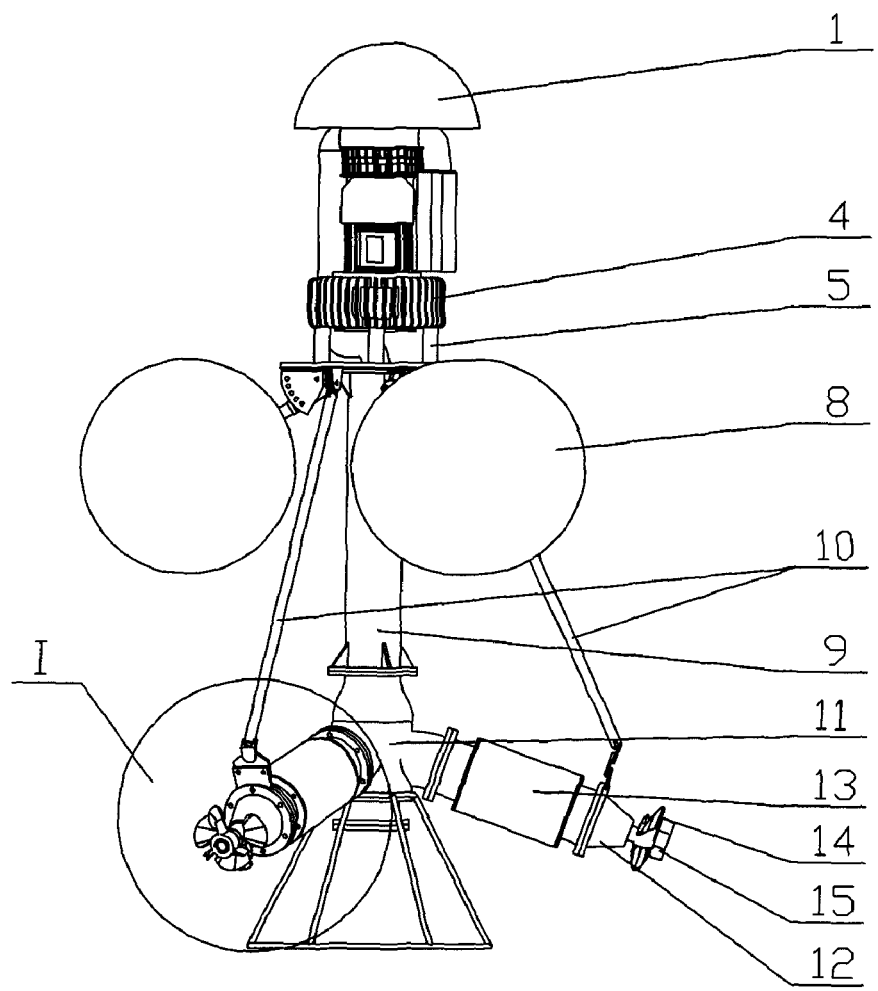
FIG. 3 is a side view of a multi-directional submersible floating aerator in FIG. 2.
Figure 4:
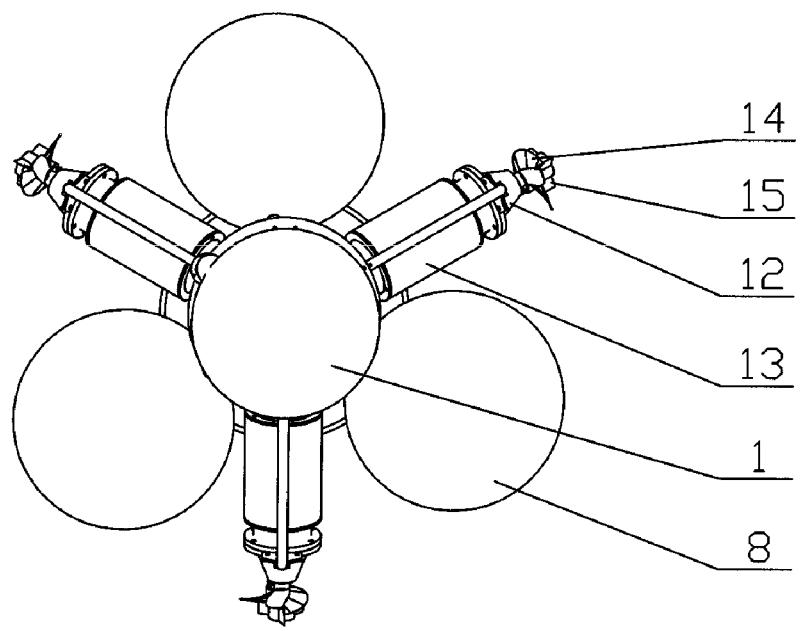
FIG. 4 is a top view of a multi-directional submersible floating aerator in FIG. 2.
Figure 5:
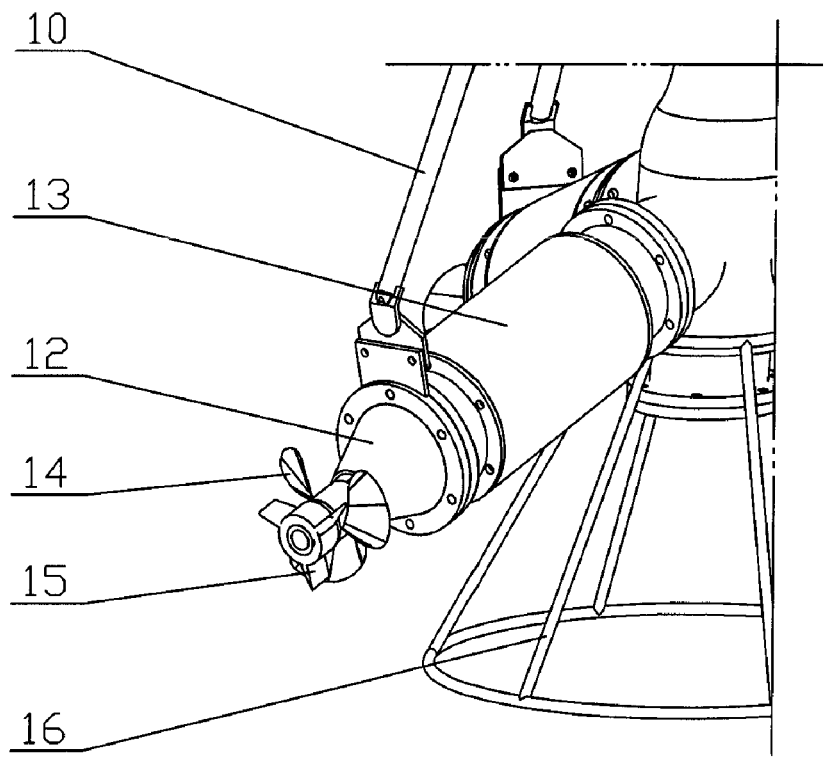
FIG. 5 is an enlarged view of a part I in FIG. 3.

As shown in FIGS. 2-5, a multi-direction submersible floating aerator of the invention comprises a rain cover 1, an air inlet pipe 2, a compressed air pipe 3, a gas-ring compressor 4, a bracket 5, a base 6, a floating ball 8, a gas inlet tube 9, multiple pull rods 10, a seat 11, a dome 12, multiple submersible hollow shaft motors 13, multiple propellers 14, and a second support 16.

The rain cover 1 is disposed above the gas-ring compressor 4.

The air inlet pipe 2 is connected to the gas-ring compressor 4.

The compressed air pipe 3 is connected between the gas-ring compressor 4 and the gas inlet tube 9.

The gas-ring compressor 4 is connected to the base 6 via bracket 5.

The base 6 is disposed between the gas-ring compressor 4 and the gas inlet tube 9.

The floating ball 8 is connected to the bottom of the base 6 via first support 7.

A top portion of the pull rod 10 is connected to the bottom of the base 6, and a bottom portion of the pull rod 10 is connected to the submersible hollow shaft motor 13, whereby distributing forces and reinforcing the aerator.

The seat 11 is disposed between the gas inlet tube 9 and the submersible hollow shaft motor 13. The seat 11 is hollow and multi-directional. A first opening is disposed at the top of the seat 11, and multiple evenly-distributed second openings are disposed on one side of the seat 11. In another embodiment, a third opening is disposed at the bottom of the seat 11.

Figure 7:
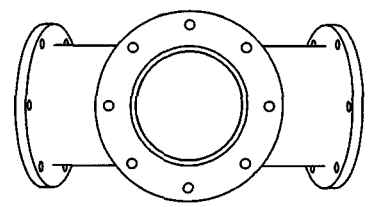
FIG. 7 is a top view of a bi-directional seat of the invention.
Figure 8:
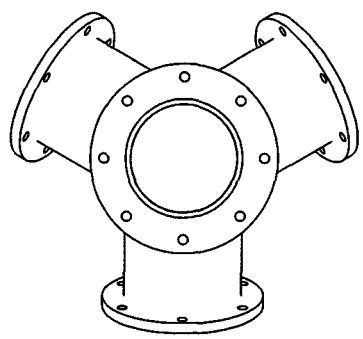
FIG. 8 is a top view of a tri-directional seat of the invention.
Figure 9:
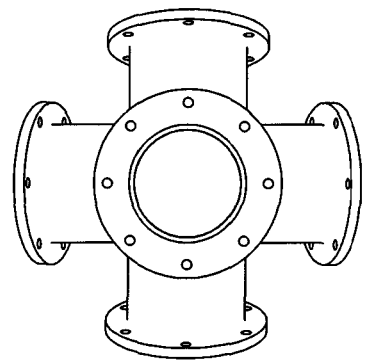
FIG. 9 is a top view of a four-directional seat of the invention.

The seat 11 is bi-directional (as shown in FIG. 7), tri-directional (as shown in FIG. 8), and quad-directional (as shown in FIG. 9), or the like.

The second openings operate to evenly distribute compressed air, and the number of the second openings is 2 or more. Compressed air from the gas-ring compressor 4 is sprayed and spread via an axial hole of a hollow transmission shaft of the submersible hollow shaft motor 13 connected to the second openings of the seat 11, thereby facilitating uniform aeration of the waste water and improving aeration efficiency.

The dome 12 is disposed on one end of the submersible hollow shaft motor 13.

An upper portion of the gas inlet tube 9 is connected to the base 6, and a lower portion of the gas inlet tube 9 is connected to the first opening of the seat 11. The second openings of the seat 11 are connected to an upper portion of the submersible hollow shaft motor 13.

The propeller 14 is coaxially connected to the submersible hollow shaft motor 13. During operation of the multi-direction submersible floating aerator, the propeller 14 rotates along with a motor, thereby facilitating mixing and driving of waste water, and increasing dissolved oxygen concentration (DO).

The second support 16 is disposed below the seat 11, and supports the body of the multi-direction submersible floating aerator.

Figure 6:
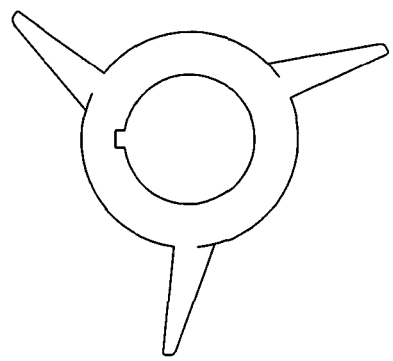
FIG. 6 is a front view of an impeller in FIG. 2.

As shown in FIG. 6, an impeller 15 is disposed at the front of the propeller 14, and the impeller 15 and the propeller 14 rotate coaxially. During aeration, the impeller 15 rotates to converge airflow, whereby increasing the velocity and the spraying distance of the airflow.

During operation, the gas-ring compressor 4 compresses air from the air inlet pipe 2, and the compressed air pipe 3 outputs compressed air. The compressed air flows through the gas inlet tube 9 and the seat 11, and is then sprayed into the waste water via axial holes of the hollow transmission shafts of the submersible hollow shaft motors 13, whereby facilitating aeration and oxygen aeration of the waste water. Then, the compressed air in the waste water is mixed and driven via the propeller 14, converged and accelerated via the impeller 15, mixed with the waste water, and thus a water-gas mixture is formed, deep water aeration is implemented, and dissolved oxygen (DO) content in the waste water is increased. Since the multi-directional seat distributes the compressed air, aeration range and area is increased during operation, aeration efficiency is improved, and dead space during oxygen aeration is eliminated.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A multi-directional submersible floating aerator, comprising
    a gas-ring compressor (4);
    a base (6);
    a gas inlet tube (9);
    a seat (11);
    multiple submersible hollow shaft motors (13); and
    multiple propellers (14);
wherein
    said base (6) is disposed between said gas-ring compressor (4) and said gas inlet tube (9);
    said propeller (14) is coaxially connected to said submersible hollow shaft motor (13);
    said seat (11) is disposed between said gas inlet tube (9) and said submersible hollow shaft motor (13);
    said seat (11) is hollow;
    a first opening is disposed at the top of said seat (11); and
    multiple second openings are disposed on one side of said seat (11).

2. The multi-directional submersible floating aerator of claim 1, wherein said seat (11) is multi-directional.

3. The multi-directional submersible floating aerator of claim 1, wherein said first opening is connected to said gas inlet tube (9).

4. The multi-directional submersible floating aerator of claim 1, wherein said second openings are connected to said submersible hollow shaft motors (13).

5. The multi-directional submersible floating aerator of claim 4, wherein the number of said second openings is two, and said second openings are symmetrical with respect to one another.

6. The multi-directional submersible floating aerator of claim 4, wherein the number of said second openings is three, and said second openings are evenly distributed.

7. The multi-directional submersible floating aerator of claim 4, wherein the number of said second openings is four, and said second openings are evenly distributed.

8. The multi-directional submersible floating aerator of claim 1, wherein
    multiple pull rods (10) are disposed around said gas inlet tube (9);
    a top portion of said pull rod (10) is connected to said base (6); and
    a bottom portion of said pull rod (10) is connected to said submersible hollow shaft motor (13).

9. The multi-directional submersible floating aerator of claim 1, wherein
    an impeller (15) is disposed at the front of said propeller (14); and
    said impeller (15) and said propeller (14) rotate coaxially.

10. The multi-directional submersible floating aerator of claim 1, wherein a bracket (5) is disposed between said gas-ring compressor (4) and said base (6).

11. The multi-directional submersible floating aerator of claim 1, further comprising a floating ball (8) connected to the bottom of said base (6) via a first support (7).

12. The multi-directional submersible floating aerator of claim 1, further comprising a rain cover (1) disposed above said gas-ring compressor (4).

13. The multi-directional submersible floating aerator of claim 1, further comprising a dome (12) disposed at one end of said submersible hollow shaft motor (13).

14. The multi-directional submersible floating aerator of claim 1, further comprising a second support (16) disposed below said seat (11).

15. The multi-directional submersible floating aerator of claim 1, further comprising an air inlet pipe (2) connected to said gas-ring compressor (4).

16. The multi-directional submersible floating aerator of claim 1, further comprising a compressed air pipe (3) connected between said gas-ring compressor (4) and said gas inlet tube (9).

* * * * *